(12) United States Patent
Wang et al.

(10) Patent No.: US 11,662,863 B2
(45) Date of Patent: May 30, 2023

(54) TOUCH SUBSTRATE AND PREPARATION METHOD THEREOF, AND TOUCH DEVICE

(71) Applicants: Hefei Xinsheng Optoelectronics Technology Co., Ltd., Anhui (CN); BOE Technology Group Co., Ltd., Beijing (CN)

(72) Inventors: Jing Wang, Beijing (CN); Dong Li, Beijing (CN); Xiaodong Xie, Beijing (CN); Min He, Beijing (CN); Wenjie Xu, Beijing (CN); Yuan Li, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/359,508

(22) Filed: Jun. 26, 2021

(65) Prior Publication Data
US 2022/0197434 A1    Jun. 23, 2022

(30) Foreign Application Priority Data
Dec. 17, 2020  (CN) .......................... 202011495546.0

(51) Int. Cl.
*G06F 3/044*     (2006.01)
*G06F 3/041*     (2006.01)

(52) U.S. Cl.
CPC .......... *G06F 3/0445* (2019.05); *G06F 3/0412* (2013.01); *G06F 3/0446* (2019.05); *G06F 2203/04103* (2013.01); *G06F 2203/04107* (2013.01)

(58) Field of Classification Search
CPC ...... G06F 3/046; G06F 3/0446; G06F 3/0445; G06F 3/0412; G06F 2203/04107; G06F 2203/04103; G06F 2203/04106
See application file for complete search history.

(56) References Cited

U.S. PATENT DOCUMENTS

| 2012/0013554 | A1* | 1/2012 | Nam | G06F 3/044 |
| | | | | 345/173 |
| 2016/0252999 | A1* | 9/2016 | Yang | G06F 3/0446 |
| | | | | 345/174 |
| 2019/0354239 | A1* | 11/2019 | Nakayama | G06F 3/0446 |

* cited by examiner

*Primary Examiner* — Deeprose Subedi
(74) *Attorney, Agent, or Firm* — Ling Wu; Stephen Yang; Ling and Yang Intellectual Property

(57) ABSTRACT

Provided are a touch substrate, a preparation method thereof and a touch device. The touch substrate includes a substrate, and a first conductive layer, a first insulating layer and a second conductive layer sequentially stacked on the substrate. The first conductive layer includes a first capacitive touch electrode, a first wiring and a second wiring. The first wiring is electrically connected to the first capacitive touch electrode, and the second wiring is insulated from the first capacitive touch electrode. The first insulating layer includes at least one first via. The second conductive layer includes a second capacitive touch electrode, which is electrically connected to the second wiring through the first via. The second conductive layer further includes an additional functional channel, which is insulated from the second capacitive touch electrode.

19 Claims, 5 Drawing Sheets

| 1 | 2 | ... | 0 |
| Q | W | ... | P |
| A | S | ... | L |
| ... | | | ... |

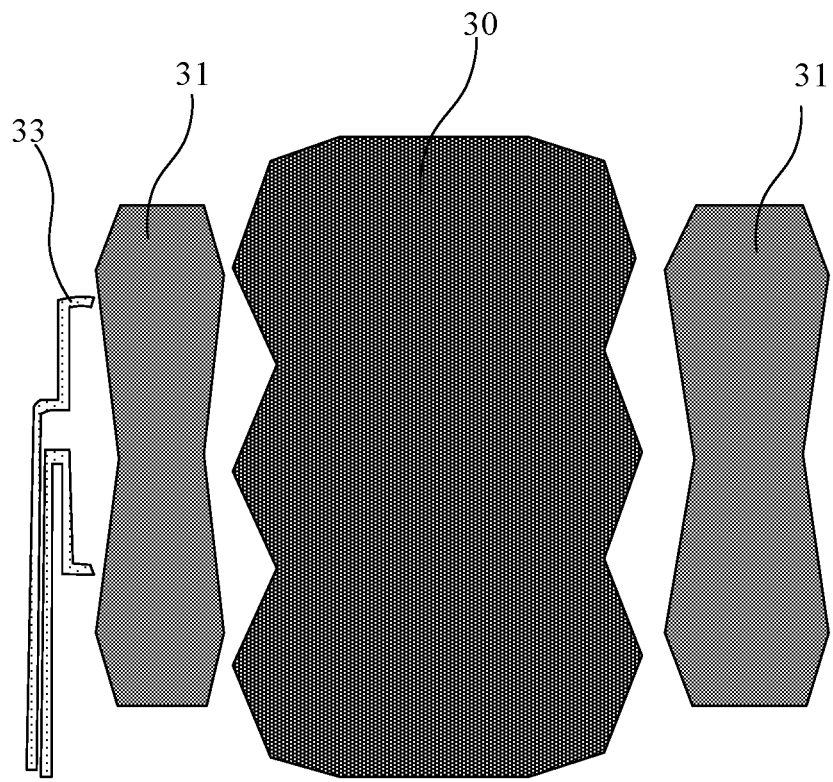

FIG. 7

| | |
|---|---|
| Forming a first conductive layer on a substrate, wherein the first conductive layer includes a first capacitive touch electrode, a first wiring and a second wiring; the first wiring is electrically connected to the first capacitive touch electrode, and the second wiring is insulated from the first capacitive touch electrode. | S1 |

↓

| | |
|---|---|
| Forming a first insulating layer on one side of the first conductive layer away from the substrate, wherein the first insulating layer includes at least one first via. | S2 |

↓

| | |
|---|---|
| Forming a second conductive layer on one side of the first insulating layer away from the first conductive layer, wherein the second conductive layer includes a second capacitive touch electrode, which is electrically connected to the second wiring through the first via. The second conductive layer further includes an additional functional channel, which is insulated from the second capacitive touch electrode. | S3 |

FIG. 8

TOUCH SUBSTRATE AND PREPARATION METHOD THEREOF, AND TOUCH DEVICE

CROSS-REFERENCE TO RELATED APPLICATION

The present application claims priority of Chinese Patent Application No. 202011495546.0 filed to the CNIPA on Dec. 17, 2020, the content of which is hereby incorporated by reference.

TECHNICAL FIELD

The present disclosure relates to, but is not limited to, the field of display technology, in particular to a touch substrate and a preparation method thereof, and a touch device.

BACKGROUND

With the rapid development of science and technology, the touch technology has been applied to various electronic devices and fields, and is increasingly sought-after by users. Touch panels can be divided into types of capacitive, resistive, infrared, surface acoustic wave, electromagnetic, vibration wave induction and frustrated total internal reflection optical sensor, etc. according to the operation principle. Among them, the touch panel of capacitive type is widely used in various interactive electronic devices for its unique touch principle, high sensitivity, long life and high light transmittance.

SUMMARY

The following is a summary of subject matters described in detail in the present disclosure. This summary is not intended to limit the protection scope of the claims.

Embodiments of the present disclosure provide a touch substrate, which includes a substrate, and a first conductive layer, a first insulating layer and a second conductive layer sequentially stacked on the substrate, wherein the first conductive layer includes a first capacitive touch electrode, a first wiring and a second wiring. The first wiring is electrically connected to the first capacitive touch electrode, and the second wiring is insulated from the first capacitive touch electrode. The first insulating layer includes at least one first via. The second conductive layer includes a second capacitive touch electrode, which is electrically connected to the second wiring through the first via. The second conductive layer further includes an additional functional channel, which is insulated from the second capacitive touch electrode.

In an exemplary embodiment, the first capacitive touch electrode is a driving electrode and the second capacitive touch electrode is a sensing electrode; or the first capacitive touch electrode is a sensing electrode and the second capacitive touch electrode is a driving electrode.

In an exemplary embodiment, the touch substrate further includes a binding region, which includes an additional functional binding region and a touch binding region; the additional functional binding region and the touch binding region are disposed side by side, and share a flexible printed circuit board. When the additional functional channel operates, the additional functional driving chip connected to the additional functional binding region is configured to: power on and perform data transmission and processing to carry out the function of the additional functional channel.

In an exemplary embodiment, the first conductive layer further includes a first dummy electrode located on both sides of the first capacitive touch electrode along a second direction, and the first dummy electrode and the first capacitive touch electrode are insulated from each other.

In an exemplary embodiment, the second conductive layer further includes a second dummy electrode and a dummy electrode connecting wire; the second dummy electrode included multiple second sub-dummy electrodes located on both sides of the second capacitive touch electrode along a second direction; the second sub-dummy electrodes and the second capacitive touch electrode are insulated from each other, and the multiple second sub-dummy electrodes are electrically connected through the dummy electrode connecting wires.

In an exemplary embodiment, an orthographic projection of the second dummy electrode on the substrate includes an orthographic projection of the first wiring on the substrate, and the orthographic projection of the second dummy electrode on the substrate includes an orthographic projection of the second wiring on the substrate.

In an exemplary embodiment, the additional functional channel is an electromagnetic channel, which includes a second electromagnetic touch electrode and a fourth wiring; the second electromagnetic touch electrode is located on both sides of the second capacitive touch electrode along the first direction, and the second electromagnetic touch electrode and the second capacitive touch electrode are insulated from each other; the fourth wiring is electrically connected to the second electromagnetic touch electrode.

The first conductive layer further includes a first electromagnetic touch electrode and a third wiring; the first electromagnetic touch electrode is located on both sides of the first capacitive touch electrode along the second direction, and the first electromagnetic touch electrode and the first capacitive touch electrode are insulated from each other; the third wiring is electrically connected to the first electromagnetic touch electrode.

In an exemplary embodiment, the first electromagnetic touch electrode includes multiple electrodes, and the multiple first electromagnetic touch electrodes are parallel to each other.

The second electromagnetic touch electrode includes multiple electrodes, and the multiple second electromagnetic touch electrodes are parallel to each other.

The first electromagnetic touch electrode and the second electromagnetic touch electrode are disposed in a cross insulation.

The first electromagnetic touch electrode is configured to determine coordinate information of a touch point in the second direction when electromagnetic touch occurs, and the second electromagnetic touch electrode is configured to determine coordinate information of a touch point in the first direction.

In an exemplary embodiment, the first electromagnetic touch electrode is located between two adjacent first capacitive touch electrodes, and the second electromagnetic touch electrode is located between two adjacent second capacitive touch electrodes.

In an exemplary embodiment, the additional functional channel is an electromagnetic channel, which includes a second electromagnetic touch electrode; the second electromagnetic touch electrode is located on both sides of the second capacitive touch electrode along the first direction, and the second electromagnetic touch electrode and the second capacitive touch electrode are insulated from each other.

The first conductive layer further includes a first electromagnetic touch electrode, a third wiring and a fourth wiring, and the first insulating layer further includes a second via; the first electromagnetic touch electrode is located on both sides of the first capacitive touch electrode along the second direction, and the first electromagnetic touch electrode and the first capacitive touch electrode are insulated from each other; the third wiring is electrically connected to the first electromagnetic touch electrode, and the fourth wiring is connected to the second electromagnetic touch electrode through the second via.

In an exemplary embodiment, the first electromagnetic touch electrode includes multiple electrodes, and the multiple first electromagnetic touch electrodes are parallel to each other.

The second electromagnetic touch electrode includes multiple electrodes, and the multiple second electromagnetic touch electrodes are parallel to each other.

The first electromagnetic touch electrode and the second electromagnetic touch electrode are disposed in a cross insulation.

The first electromagnetic touch electrode is configured to determine coordinate information of a touch point in the second direction when electromagnetic touch occurs, and the second electromagnetic touch electrode is configured to determine coordinate information of a touch point in the first direction.

In an exemplary embodiment, the first electromagnetic touch electrode is located between two adjacent first capacitive touch electrodes, and the second electromagnetic touch electrode is located between two adjacent second capacitive touch electrodes.

In an exemplary embodiment, the additional functional channel is an antenna channel, and the first conductive layer further includes an antenna lead; the antenna channel includes a wireless communication antenna, and the first insulating layer includes a third via through which the antenna lead is electrically connected to the wireless communication antenna, and the wireless communication antenna extends along the second direction.

In an exemplary embodiment, the wireless communication antenna is a Bluetooth communication antenna, a WiFi communication antenna or a GPS antenna.

In an exemplary embodiment, the wireless communication antenna includes one antenna or multiple antennas, and one wireless communication antenna is located between two adjacent second capacitive touch electrodes.

In an exemplary embodiment, a light shield layer is provided between the substrate and the first conductive layer, and an orthographic projection of the light shield layer on the substrate includes the orthographic projections of the first wiring and the second wiring on the substrate.

In an exemplary embodiment, the touch substrate further includes a second insulating layer disposed on the second conductive layer and a transparent photosensitive layer disposed on the second insulating layer, wherein the transparent photosensitive layer is a transparent photosensitive keyboard film attached on the second insulating layer or transparent photosensitive ink printed on the second insulating layer.

An embodiment of the present disclosure further provides a touch device, which includes any touch substrate of the aforementioned embodiments.

An embodiment of the present disclosure further provides a preparation method of a touch substrate, including: forming a first conductive layer on a substrate, wherein the first conductive layer includes a first capacitive touch electrode, a first wiring and a second wiring; the first wiring is electrically connected to the first capacitive touch electrode, and the second wiring is insulated from the first capacitive touch electrode; forming a first insulating layer on one side of the first conductive layer away from the substrate, wherein the first insulating layer includes at least one first via; forming a second conductive layer on one side of the first insulating layer away from the first conductive layer, wherein the second conductive layer includes a second capacitive touch electrode, the second capacitive touch electrode electrically connected to the second wiring through the first via; the second conductive layer further includes an additional functional channel, which is insulated from the second capacitive touch electrode.

In an exemplary embodiment, the preparation method further includes: forming a second insulating layer on one side of the second conductive layer away from the first insulating layer; forming a transparent photosensitive layer on one side of the second insulating layer away from the second conductive layer, wherein the transparent photosensitive layer is a transparent photosensitive keyboard film attached on the second insulating layer or transparent photosensitive ink printed on the second insulating layer.

Of course, an implementation of any product or method in the embodiments of the present disclosure does not need to achieve all the advantages mentioned above at the same time. Other features and advantages of the present disclosure will be set forth in the following embodiments of the description, and in part will become apparent from the embodiments of the description, or be learned by practice of the present disclosure. Purposes and other advantages of the technical schemes of the present disclosure may be achieved and acquired by structures specified in the detailed description and drawings.

Other aspects will become apparent upon reading and understanding accompanying drawings and the detailed description.

BRIEF DESCRIPTION OF DRAWINGS

The attached drawings are for providing a further understanding of the technical solutions of the present disclosure and constitute a part of the description. They are for explaining the technical solutions of the present disclosure together with the embodiments of the present application and do not constitute a limitation on the technical solutions of the present disclosure. The shape and size of each component in the drawings do not reflect true proportions and only to be used to schematically illustrate contents of the present disclosure.

FIG. 7 is a schematic diagram of a touch substrate after formation of a pattern of a first conductive layer according to an embodiment of the present disclosure.

FIG. 8 is a flowchart of a preparation method of a touch substrate according to an embodiment of the present disclosure.

DETAILED DESCRIPTION

Figure 1:
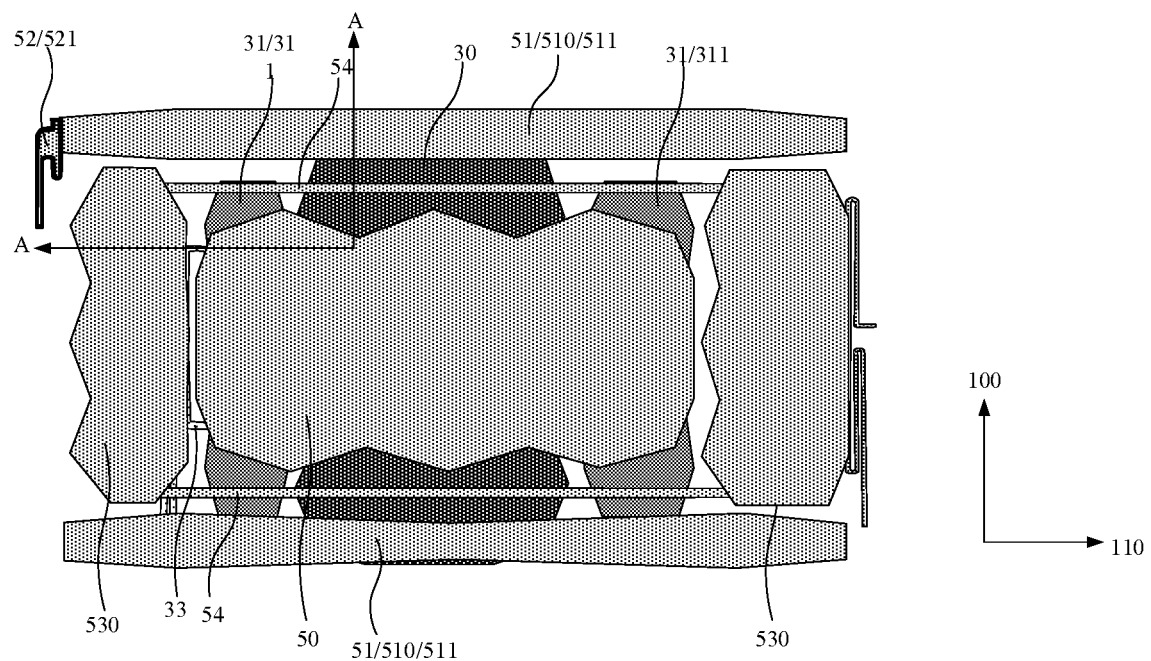
FIG. 1 is a schematic diagram of a structure of a touch substrate according to an embodiment of the present disclosure.

Embodiments of the present disclosure will be described in detail hereinafter with reference to the accompanying drawings. The embodiments and features in the embodiments in the present disclosure may be combined randomly if there is no conflict.

Unless otherwise defined, technical terms or scientific terms used in the embodiments of the present disclosure shall have the common meanings as construed by those of ordinary skills in the art to which the present disclosure pertains. The words "first", "second" and the like used in the embodiments of the present disclosure do not represent any order, quantity or importance, but are merely used to distinguish among different components. Similar words such as "including" or "containing" mean that elements or articles appearing before the word cover elements or articles listed after the word and their equivalents, without excluding other elements or articles.

Those skilled in the art may understand that transistors used in all embodiments of the present disclosure may be thin film transistors or field-effect transistors or other devices with same characteristics. The thin film transistor used in the embodiments of the present disclosure may be an oxide semiconductor transistor. Since a source and a drain of a transistor used here are symmetrical, the source and the drain may be interchanged. In the embodiments of the present disclosure, to distinguish the two electrodes, one of two electrodes of the transistor other than the gate is referred to as the first electrode and the other electrode is referred to as the second electrode. The first electrode may be a source or a drain, and the second electrode may be a drain or a source.

In recent years, lightness and full-screen is the main direction that users pursue in the design of smart devices. Smaller size, thinner thickness and lighter weight improve the portability of smart devices, making smart devices such as laptops and tablets convenient tools in mobile office. However, the popularity of full-screen and lightness has brought a new design problem such as how to achieve such desired traits, while taking into account a variety of user experiences and functions.

Embodiments of the present disclosure provide a touch substrate, which includes a substrate, and a first conductive layer, a first insulating layer and a second conductive layer sequentially stacked on the substrate, wherein, the first conductive layer includes a first capacitive touch electrode, a first wiring and a second wiring. The first wiring is electrically connected to the first capacitive touch electrode, and the second wiring is insulated from the first capacitive touch electrode. The first insulating layer includes at least one first via. The second conductive layer includes a second capacitive touch electrode, which is electrically connected to the second wiring through the first via. The second conductive layer further includes an additional functional channel, which is insulated from the second capacitive touch electrode.

According to the touch substrate provided by the present embodiments, the configuration of a first conductive layer, a first insulating layer and a second conductive layer, as well as the adding of additional functional channels in the second conductive layer does not increase the quantity of product Masks. By conducting and integrating additional functions on a touch substrate without introducing additional function mechanism modules, the cost is lowered, the product thickness is reduced, while the integration degree is high, thus there is no need to worry about the problem with structure matching, so that the full-screen can be kept with lightness, with multiple considerations taken into account.

The following describes the technical solution of the present disclosure through multiple embodiments.

Figure 2:
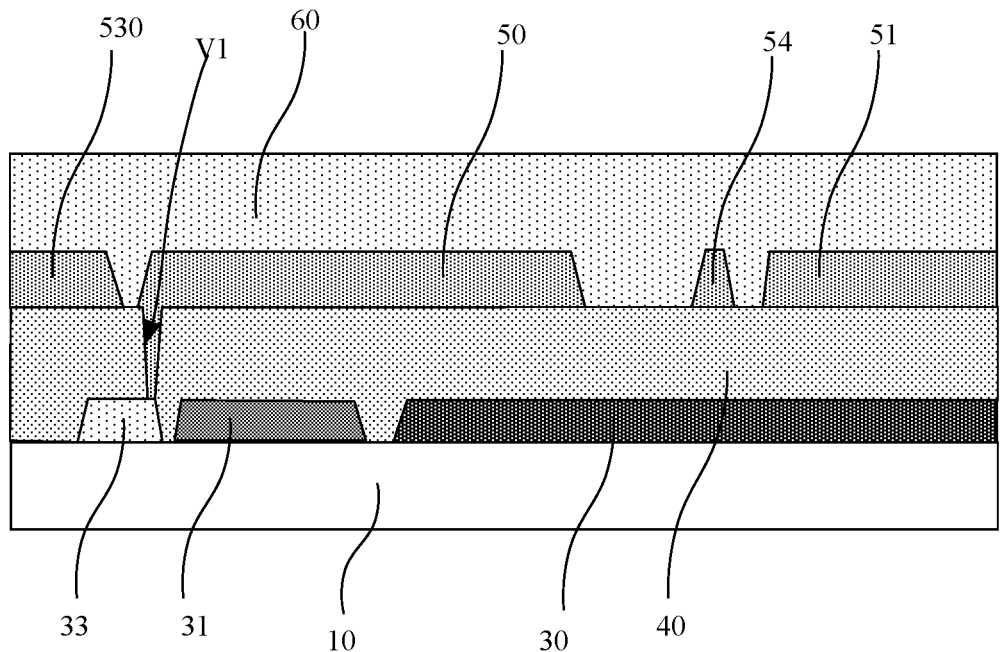
FIG. 2 is a schematic diagram of a cross-sectional structure of the touch substrate in AA region in FIG. 1.

FIG. 1 is a schematic diagram of a structure of a touch substrate according to an embodiment of the present disclosure, and FIG. 2 is a schematic diagram of a cross-sectional structure of the touch substrate in AA region in FIG. 1. As shown in FIGS. 1 and 2, the touch substrate according to the embodiments includes a substrate 10, and a first conductive layer, a first insulating layer 40 and a second conductive layer sequentially stacked on the substrate 10. The first conductive layer includes a first capacitive touch electrode 30, a first wiring (not shown) and a second wiring 33. The first capacitive touch electrode 30 includes multiple first sub-electrodes (not shown) disposed along the first direction 100, and two adjacent first sub-electrodes are connected to each other along the first direction 100. The first wiring is electrically connected to the first capacitive touch electrode 30, and the second wiring 33 and the first capacitive touch electrode 30 are insulated from each other.

The first insulating layer 40 includes at least one first via V1. The second conductive layer includes a second capacitive touch electrode 50, which includes multiple second sub-electrodes disposed along the second direction 110, and two adjacent second sub-electrodes are connected to each other along the second direction 110. The second capacitive touch electrode 50 is electrically connected to the second wiring 33 through the first via V1. The second conductive layer further includes an additional functional channel 51, and the additional functional channel 51 and the second capacitive touch electrode 50 are insulated from each other.

In the present embodiment, the types of the first capacitive touch electrode 30 and the second capacitive touch electrode 50 are not limited. The first capacitive touch electrode 30 may be a driving electrode and the second capacitive touch electrode 50 may be a sensing electrode, or the first capacitive touch electrode 30 may be a sensing electrode and the second capacitive touch electrode 50 may be a driving electrode.

In addition, the shapes and sizes of the first capacitive touch electrode 30 and the second capacitive touch electrode 50 are not limited in the present embodiment, and can be set according to actual requirements, such as touch accuracy, Integrate Circuit (IC), etc.

FIG. 1 only schematically shows a first capacitive touch electrode 30 and a second capacitive touch electrode 50. Correspondingly, FIG. 1 only schematically shows first dummy electrodes 31 on both sides of the first capacitive touch electrode 30, additional functional channels 51 on both sides of the second capacitive touch electrode 50 along the first direction 100 and second dummy electrodes on both sides of the second capacitive touch electrode 50 along the second direction 110. The actual touch substrate may include multiple first capacitive touch electrodes 30 and multiple second capacitive touch electrodes 50, and correspondingly, may include multiple first dummy electrodes 31, multiple additional functional channels 51 and multiple second dummy electrodes, which is not limited by this disclosure.

In an exemplary embodiment, the touch substrate further includes a binding region, which includes an additional functional binding region and a touch binding region. The additional functional binding region and the touch binding region are disposed side by side, and they can share a Flexible Printed Circuit (FPC). When the additional functional channel 51 operates, the additional functional driver chip bound and connected to the binding pins of the additional functional binding region is powered on for data transmission and processing to carry out the function of the additional functional channel 51.

In an exemplary embodiment, both a first direction 100 and a second direction 110 are perpendicular to the thickness direction of the touch substrate. The embodiment of the present disclosure does not limit the size of the included angle between the first direction 100 and the second direction 110. For example, they can be perpendicular to each other, that it, the first capacitive touch electrode 30 and the second capacitive touch electrode 50 may be perpendicular to each other as a whole. In an exemplary embodiment, both the first capacitive touch electrode 30 and the second capacitive touch electrode 50 are in a grid structure, and the first sub-electrode and the second sub-electrode are both made of metallic materials. Due to the low resistance, good conductivity and high sensitivity of metal materials, the transmission delay of electrical signals in the first capacitive touch electrode 30 and the second capacitive touch electrode 50 can be avoided, improving the touch effect. The shape of the grid in the grid structure may be regular polygon or irregular polygon.

In an exemplary embodiment, as shown in FIG. 1 and FIG. 2, the first conductive layer further includes a first dummy electrode 31 located on both sides of the first capacitive touch electrode 30 along the second direction 110, and the first dummy electrode 31 and the first capacitive touch electrode 30 are insulated from each other.

In an exemplary embodiment, as shown in FIG. 1 and FIG. 2, the second conductive layer further includes a second dummy electrode and a dummy electrode connecting wire 54; the second dummy electrode included multiple second sub-dummy electrodes 530 located on both sides of the second capacitive touch electrode 50 along the second direction 110; the second sub-dummy electrodes 530 and the second capacitive touch electrode 50 are insulated from each other, and the multiple second sub-dummy electrodes 530 are electrically connected through the dummy electrode connecting wires 54.

In an exemplary embodiment, the touch substrate further includes a first ground line (not shown), and multiple second sub-dummy electrodes 530 are electrically connected through dummy electrode connecting wires 54 and then connected to the first ground line.

In the present embodiment, there is no limitation on how the first ground line is connected to the second sub-dummy electrode 530. For example, in the process of preparing the second sub-dummy electrode 530, the part of the second sub-dummy electrode 530 which is close to the first ground line and located in the bezel region may be extended to form a connecting wire, so that the second sub-dummy electrode 530 is connected to the first ground line. Or, after the second sub-dummy electrode 530 is prepared, the second sub-dummy electrode 530 is connected to the first ground line by a connecting wire. In the present embodiment, by connecting the second sub-dummy electrode 530 with the first ground line, static electricity on the second sub-dummy electrode 530 can be released to the first ground line, thus avoiding static electricity accumulation on the second sub-dummy electrode 530.

In an exemplary embodiment, an orthographic projection of the second dummy electrode on the substrate 10 includes an orthographic projection of the first wiring on the substrate. The orthographic projection of the second dummy electrode on the substrate 10 and an orthographic projection of the second wiring on the substrate partially coincide.

In an exemplary embodiment, as shown in FIG. 1 and FIG. 2, the additional functional channel 51 may be an electromagnetic channel, which includes a second electromagnetic touch electrode 510 and a fourth wiring 52. The second electromagnetic touch electrode 510 is located on both sides of the second capacitive touch electrode 50 along the first direction 100, and the second electromagnetic touch electrode 510 and the second capacitive touch electrode 50 are insulated from each other. The fourth wiring 52 is electrically connected to the second electromagnetic touch electrode 510.

The first conductive layer further includes a first electromagnetic touch electrode 311 and a third wiring (not shown). The first electromagnetic touch electrode 311 is located on both sides of the first capacitive touch electrode 30 along the second direction 110, and the first electromagnetic touch electrode 311 and the first capacitive touch electrode 30 are insulated from each other. The third wiring is electrically connected to the first electromagnetic touch electrode 311.

In an exemplary embodiment, the first electromagnetic touch electrode 311 may be formed by the first dummy electrode 31.

In an exemplary embodiment, as shown in FIG. 1 and FIG. 2, the additional functional channel 51 may be an electromagnetic channel, which includes a second electromagnetic touch electrode 510. The second electromagnetic touch electrode 510 is located on both sides of the second capacitive touch electrode 50 along the first direction 100, and the second electromagnetic touch electrode 510 and the second capacitive touch electrode 50 are insulated from each other.

Figure 3:
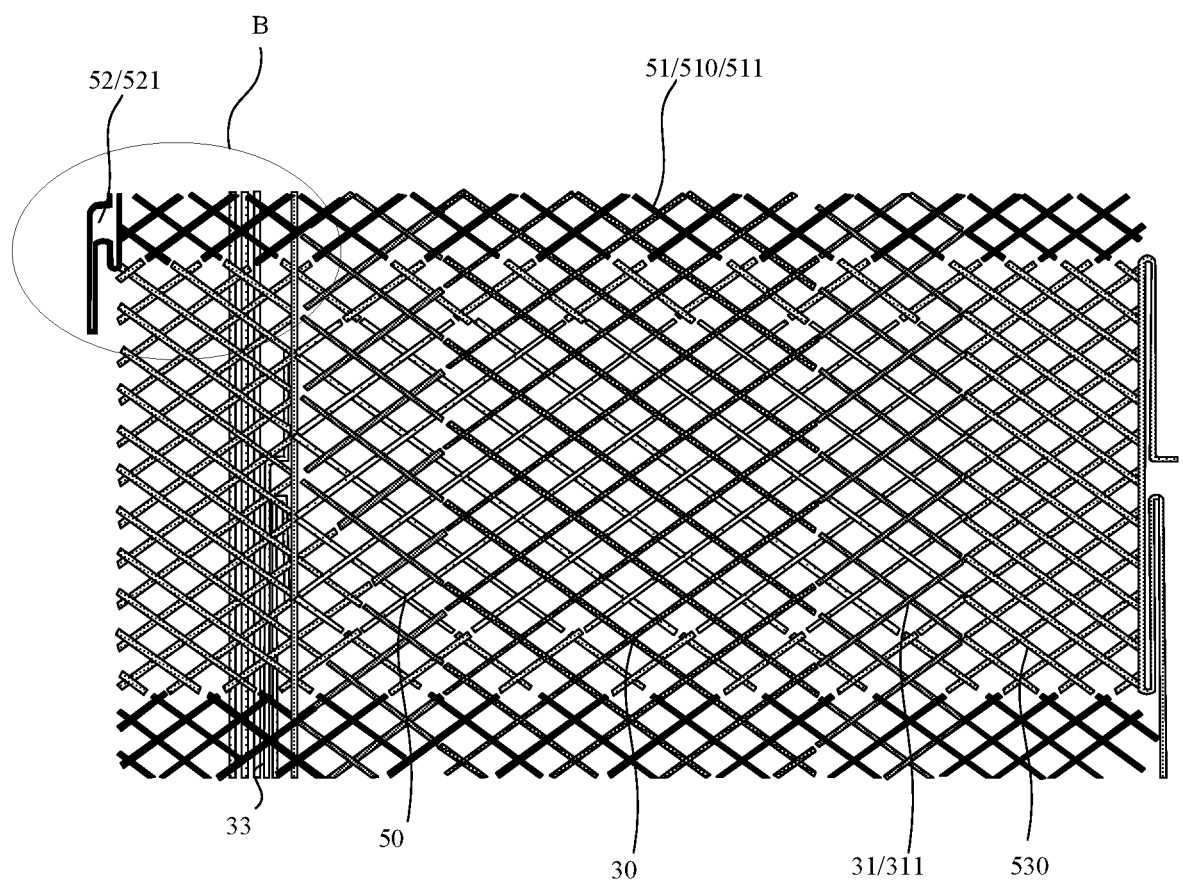
FIG. 3 is a schematic diagram of a structure of another touch substrate according to an embodiment of the present disclosure.
Figure 4:
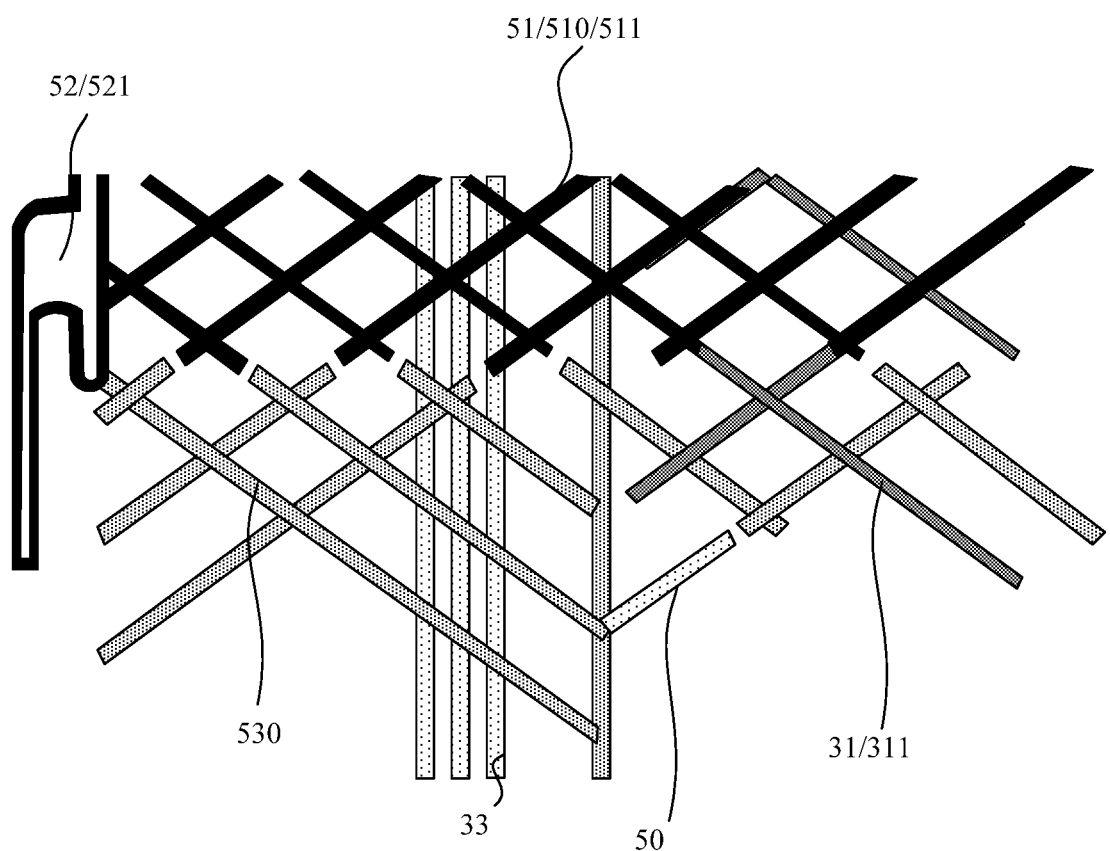
FIG. 4 is an enlarged schematic diagram of a structure of substrate in B region in FIG. 3.

The first conductive layer further includes a first electromagnetic touch electrode 311, a third wiring (not shown) and a fourth wiring 52, and the first insulating layer further 40 includes a second via (not shown). The first electromagnetic touch electrode 311 is located on both sides of the first capacitive touch electrode 30 along the second direction 110, and the first electromagnetic touch electrode 311 and the first capacitive touch electrode 30 are insulated from each other. The third wiring is electrically connected to the first electromagnetic touch electrode 311, and the fourth wiring 52 is connected to the second electromagnetic touch electrode 510 through the second via. In an exemplary embodiment, as shown in FIG. 3 and FIG. 4, Both the first electromagnetic touch electrode 311 and the second electromagnetic touch electrode 510 may be strip electrodes composed of metal meshes.

In an exemplary embodiment, the first electromagnetic touch electrode 311 includes multiple electrodes, and the multiple first electromagnetic touch electrodes 311 are parallel to each other; the second electromagnetic touch electrode 510 includes multiple electrodes, and the multiple second electromagnetic touch electrodes 510 are parallel to each other; the first electromagnetic touch electrode 311 and the second electromagnetic touch electrode 510 are disposed in a cross insulation; wherein, the first electromagnetic touch electrode 311 is configured to determine coordinate information of a touch point in the second direction 110 when electromagnetic touch occurs, and the second electromagnetic touch electrode 510 is configured to determine coordinate information of a touch point in the first direction 100.

In an exemplary embodiment, one first electromagnetic touch electrode 311 is located between two adjacent first capacitive touch electrodes 30.

In an exemplary embodiment, one second electromagnetic touch electrode 510 is located between two adjacent second capacitive touch electrodes 50.

In an exemplary embodiment, as shown in FIG. 1 and FIG. 2, the additional functional channel 51 may be an antenna channel, and the first conductive layer further includes an antenna lead 521; the antenna channel includes a wireless communication antenna 511, and the first insulating layer 40 includes a third via (not shown), through which the antenna lead 521 is electrically connected to the wireless communication antenna 511, and the wireless communication antenna 511 extends along the second direction 110.

In an exemplary embodiment, the wireless communication antenna 511 may be a Bluetooth communication antenna, a WiFi communication antenna or a GPS antenna.

In an exemplary embodiment, the wireless communication antennas 511 includes one antenna or multiple antennas, and one wireless communication antenna 511 is located between two adjacent second capacitive touch electrodes 50.

In an exemplary embodiment, the additional functional channel 51 may be partly an electromagnetic channel and partly an antenna channel. The positions of the electromagnetic channel and the wireless channel are not limited in the embodiment of the present disclosure. Exemplarily, the touch substrate can be divided into a touch region and a bezel region, wherein the additional functional channel 51 of the touch region is configured as an electromagnetic channel and the additional functional channel of the bezel region is configured as a wireless channel.

Figures 5, 6:
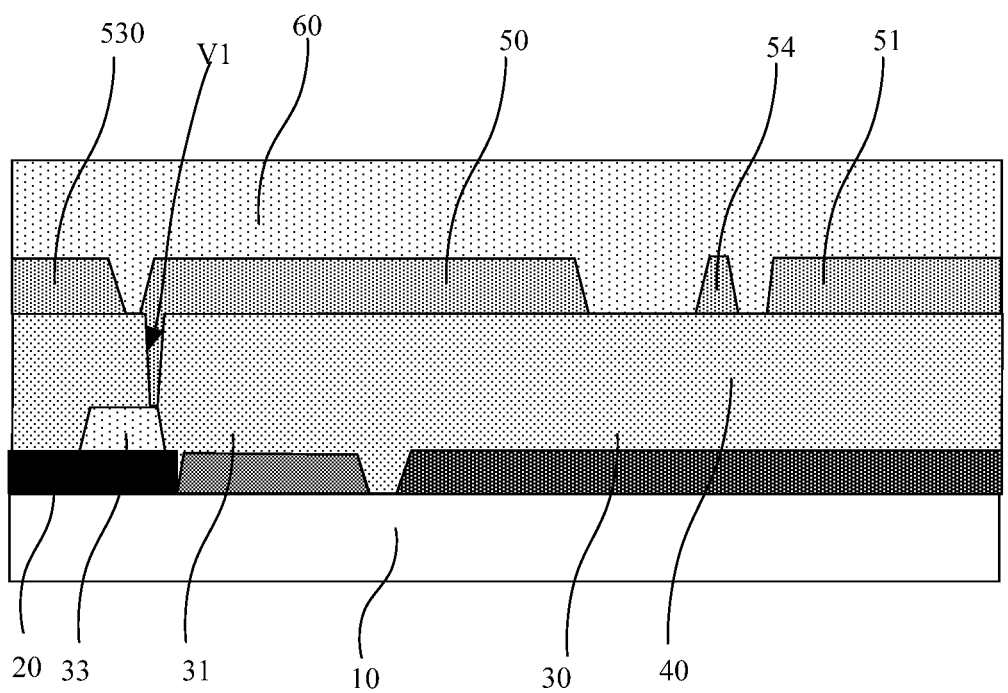
FIG. 5 is a schematic diagram of another cross-sectional structure of the touch substrate in AA region in FIG. 1.
FIG. 6 is a schematic diagram of a structure of a transparent photosensitive layer according to an embodiment of the present disclosure.

In an exemplary embodiment, as shown in FIG. 5, a light shield layer 20 is provided between the substrate 10 and the first conductive layer, and an orthographic projection of the light shield layer 20 on the substrate 10 includes the orthographic projections of the first wiring (not shown) and the second wiring 33 on the substrate 10.

In an exemplary embodiment, the light shield layer 20 is disposed to shield the first wiring (not shown) and the second wiring 33 of the bezel region.

In an exemplary embodiment, as shown in FIG. 2 and FIG. 6, the touch substrate further includes a second insulating layer 60 disposed on the second conductive layer and a transparent photosensitive layer disposed on the second insulating layer 60, wherein the transparent photosensitive layer is a transparent photosensitive keyboard film attached on the second insulating layer 60 or transparent photosensitive ink printed on the second insulating layer 60.

In an exemplary embodiment, the first insulating layer 40 and the second insulating layer 60 may be made of either or a combination of silicon oxynitride (SiOxNy) or silicon dioxide (SiO2).

On the basis of the original touch panel design, the touch substrate provided by the embodiment of the disclosure keeps the original product cost unchanged, and does not increase the quantity of Masks. Through design optimization, the functions of electromagnetic touch and capacitive touch sharing, touch keyboard, wireless communication antenna, etc. are achieved, while the interference of the display signal to the touch signal is reduced. With low cost and the lightness of the product, the utilization rate of the production line is improved.

The technical solution of the present embodiment is further described below through a preparation process of the touch substrate according to the present embodiment. The "patterning process" in the present embodiment includes film layer deposition, coating of photoresist, mask exposure, development, etching, stripping of photoresist, and so on. The "photolithography process" in the present embodiment includes film layer coating, mask exposure, development, and so on, and is a mature preparation process. Deposition may be performed by using a known process such as sputtering, chemical vapor deposition or the like, coating may be performed by using a known coating process, and etching may be performed by using a known method, which is not limited here.

(1) Forming a pattern of a first conductive layer in the bezel region and the touch region of the substrate 10, which may include: depositing a first conductive film on the substrate, coating photoresist, exposing and developing the photoresist, and finally etching the first conductive film to form a pattern of the first conductive layer.

In an exemplary embodiment, before Step (1), the following step may be further included: forming a pattern of a black matrix 20 in the bezel region of the base substrate 10, wherein forming the pattern of the black matrix 20 may include coating, exposing and developing the base substrate to form the pattern of the black matrix 20. In the present embodiment, forming the pattern of the black matrix 20 is an optional step.

In an exemplary embodiment, the first conductive film may be a metal material, or a transparent conductive material, such as indium tin oxide ITO, indium zinc oxide IZO, carbon nanotubes, or graphene.

As shown in FIG. 7, the first conductive layer may include a first capacitive touch electrode 30, a first dummy electrode 31, a first wiring (not shown) and a second wiring 33. Wherein, the first capacitive touch electrode 30 may include multiple first sub-electrodes disposed along the first direction, and two adjacent first sub-electrodes are connected to each other along the first direction. The first dummy electrode 31 and the first capacitive touch electrode 30 are insulated from each other, the first wiring is electrically connected to the first capacitive touch electrode 30, and the second wiring 33 and the first capacitive touch electrode 30 are insulated from each other.

(2) Forming a pattern of the first insulating layer 40 over the first metal layer. In the present embodiment, the pattern of the first insulating layer 40 can be formed by evaporation. The first insulating layer 40 located above the second wiring 33 is provided with at least one first via V1, which exposes the pattern of the second wiring 33. The insulating layer may be made of transparent material, so that the touch substrate can be used for integrated touch display panel.

(3) Forming a pattern of the second conductive layer over the first insulating layer 40, which may include: depositing a second conductive film on the substrate, coating photoresist, exposing and developing the photoresist, and finally etching the second conductive film to form a pattern of the second conductive layer.

In an exemplary embodiment, the second conductive film may be a metal material, or a transparent conductive material, such as indium tin oxide ITO, indium zinc oxide IZO, carbon nanotubes, or graphene.

As shown in FIG. 1, the second conductive layer may include: a second capacitive touch electrode 50, an additional functional channel 51, a fourth wiring 52, a second dummy electrode and a dummy electrode connecting wire 54, wherein the second capacitive touch electrode 50 may include multiple second sub-electrodes disposed along the second direction, and two adjacent second sub-electrodes are connected to each other along the second direction. The second capacitive touch electrode 50 is connected to the second wiring 33 through the first via on the first insulating layer 40. The additional functional channel 51 and the second capacitive touch electrode 50 are insulated from each other, the fourth wiring 52 and the second capacitive touch electrode 50 are insulated from each other, the fourth wiring 52 is electrically connected to the additional functional channel 51, and the second dummy electrode, the additional functional channel 51 and the second capacitive touch electrode 50 are insulated from each other. The second dummy electrode includes multiple second sub-dummy electrodes 530, which are connected to each other through dummy electrode connecting wires 54 and then connected to a first ground line (not shown).

The shapes and sizes of the first capacitive touch electrode 30 and the second capacitive touch electrode 50 are not limited in the embodiments of the present disclosure, and can be set according to actual requirements, such as touch accuracy, IC, etc. On this basis, the shapes and sizes of the first dummy electrode 31 and the second dummy electrode can be reasonably set according to the sizes of the first capacitive touch electrode 30 and the second capacitive touch electrode 50.

In an exemplary embodiment, the shape of the second sub-electrode is the same as that of the first sub-electrode, and the projection of each second sub-electrode on the substrate does not coincide with the projection of the first sub-electrode on the substrate.

(4) Forming a pattern of the second insulating layer 60 over the second conductive layer. The second insulating layer is located in the bezel region and the touch region, and the pattern of the second insulating layer 60 can be formed by evaporation.

In an exemplary embodiment, the first insulating layer and the second insulating layer may be made of SiOxNy or SiO2.

(5) Forming a pattern of a transparent photosensitive layer over the second insulating layer 60. The transparent photosensitive layer may be a transparent photosensitive keyboard film attached on the second insulating layer 60 or transparent photosensitive ink printed on the second insulating layer 60.

It can be seen from the above preparation process that, according to the touch substrate provided by the present embodiments, the configuration of a first conductive layer, a first insulating layer and a second conductive layer, as well as the adding of additional functional channels in the second conductive layer does not increase the quantity of product Masks. By conducting and integrating additional functions on a touch substrate without introducing additional functional mechanism modules, the cost is lowered, the product thickness is reduced, while the integration degree is high, thus there is no need to worry about the problem with structure matching, so that the full-screen can be kept with lightness, with multiple considerations taken into account.

The description of the structure and preparation process of the touch substrate according to the present disclosure is merely illustrative. In an exemplary embodiment, according to actual needs corresponding structures may be changed and patterning processes may be added or reduced. For example, the fourth wiring 52 may be located on the second conductive layer or on the first conductive layer, and the pattern of the first conductive layer may be formed by one patterning process or by two or more patterning processes. The pattern of the second conductive layer may be formed by one patterning process or by two or more patterning processes, and so on. The present disclosure is not limited here.

An embodiment of the present disclosure further provides a touch device, which includes the aforementioned touch substrate.

The type of the touch device is not limited in the embodiments of the present disclosure, and may be a liquid crystal display device, an Organic Light Emitting Diode (OLED) display device, or any other types of display devices, or a simple touch device.

When the touch device is a liquid crystal display device, the liquid crystal display device includes an array substrate and a cell aligning substrate, wherein the array substrate includes a thin film transistor and a pixel electrode, and the color filter layer may be disposed on the array substrate or on the cell aligning substrate. At this time, the touch substrate may be an array substrate or a cell aligning substrate. When the touch device is an OLED display device, the OLED display device includes an array substrate and a encapsulation substrate, wherein the array substrate can include a thin film transistor, an anode electrically connected to the drain of the thin film transistor, a cathode and an organic material functional layer. At this time, the touch substrate can be an array substrate or a encapsulation substrate.

According to the touch device provided by the present embodiments, the configuration of a first conductive layer, a first insulating layer and a second conductive layer, as well as the adding of additional functional channels in the second conductive layer does not increase the quantity of product Masks. The full-screen can be kept with lightness, with multiple considerations taken into account, which improves product competitiveness.

In an exemplary embodiment, the touch device further includes a photosensitive lamp which is disposed on one side of the touch substrate. When the keyboard function is needed, the touch keyboard function can be achieved by turning on the photosensitive lamp switch.

An embodiment of the present disclosure further provides a preparation method of a touch substrate. As shown in FIG. 8, the method includes:

Step S1: Forming a first conductive layer on a substrate, wherein the first conductive layer includes a first capacitive touch electrode, a first wiring and a second wiring; the first wiring is electrically connected to the first capacitive touch electrode, and the second wiring is insulated from the first capacitive touch electrode.

Step S2: Forming a first insulating layer on one side of the first conductive layer away from the substrate, wherein the first insulating layer includes at least one first via.

Step S3: Forming a second conductive layer on one side of the first insulating layer away from the first conductive layer, wherein the second conductive layer includes a second capacitive touch electrode, which is electrically connected to the second wiring through the first via. The second conductive layer further includes an additional functional channel, which is insulated from the second capacitive touch electrode.

In an exemplary embodiment, the first capacitive touch electrode includes multiple first sub-electrodes disposed along a first direction, and two adjacent first sub-electrodes are connected to each other in the first direction.

In an exemplary embodiment, the second capacitive touch electrode includes multiple second sub-electrodes disposed along a second direction, and two adjacent second sub-electrodes are connected to each other in the second direction.

In an exemplary embodiment, the preparation method further includes:

forming a second insulating layer on one side of the second conductive layer away from the first insulating layer;

forming a transparent photosensitive layer on one side of the second insulating layer away from the second conductive layer, wherein the transparent photosensitive layer is a transparent photosensitive keyboard film attached on the second insulating layer or transparent photosensitive ink printed on the second insulating layer.

In some exemplary embodiments, prior to Step S1, the preparation method further includes:

forming a light shield layer on the substrate, wherein an orthographic projection of the light shield layer on the substrate includes the orthographic projections of the first wiring and the second wiring on the substrate.

In an exemplary embodiment, the first conductive layer further includes a first dummy electrode located on both sides of the first capacitive touch electrode along a second direction, and the first dummy electrode and the first capacitive touch electrode are insulated from each other.

In an exemplary embodiment, the second conductive layer further includes a second dummy electrode and a dummy electrode connecting wire; the second dummy electrode included multiple second sub-dummy electrodes located on both sides of the second capacitive touch electrode along a second direction; the second sub-dummy electrodes and the second capacitive touch electrode are insulated from each other, and the multiple second sub-dummy electrodes are electrically connected through the dummy electrode connecting wires.

In an exemplary embodiment, an orthographic projection of the second dummy electrode on the substrate includes an orthographic projection of the first wiring on the substrate, and the orthographic projection of the second dummy electrode on the substrate includes an orthographic projection of the second wiring on the substrate.

In an exemplary embodiment, the additional functional channel is an electromagnetic channel, which includes a second electromagnetic touch electrode and a fourth wiring; the second electromagnetic touch electrode is located on both sides of the second capacitive touch electrode along the first direction, and the second electromagnetic touch electrode and the second capacitive touch electrode are insulated from each other; the fourth wiring is electrically connected to the second electromagnetic touch electrode.

The first conductive layer further includes a first electromagnetic touch electrode and a third wiring; the first electromagnetic touch electrode is located on both sides of the first capacitive touch electrode along the second direction, and the first electromagnetic touch electrode and the first capacitive touch electrode are insulated from each other; the third wiring is electrically connected to the first electromagnetic touch electrode.

In an exemplary embodiment, the additional functional channel is an electromagnetic channel, which includes a second electromagnetic touch electrode; the second electromagnetic touch electrode is located on both sides of the second capacitive touch electrode along the first direction, and the second electromagnetic touch electrode and the second capacitive touch electrode are insulated from each other.

The first conductive layer further includes a first electromagnetic touch electrode, a third wiring and a fourth wiring, and the first insulating layer further includes a second via; the first electromagnetic touch electrode is located on both sides of the first capacitive touch electrode along the second direction, and the first electromagnetic touch electrode and the first capacitive touch electrode are insulated from each other; the third wiring is electrically connected to the first electromagnetic touch electrode, and the fourth wiring is connected to the second electromagnetic touch electrode through the second via.

In an exemplary embodiment, the additional functional channel is an antenna channel, and the first conductive layer further includes an antenna lead; the antenna channel includes a wireless communication antenna, and the first insulating layer includes a third via through which the antenna lead is electrically connected to the wireless communication antenna, and the wireless communication antenna extends along the second direction.

According to the preparation method of the touch substrate provided by the present embodiments, the forming of a first conductive layer, a first insulating layer and a second conductive layer, as well as the forming of additional functional channels in the second conductive layer does not increase the quantity of product Masks. By conducting and integrating additional functions on a touch substrate without introducing additional functional mechanism modules, the cost is lowered, the product thickness is reduced, while the integration degree is high, thus there is no need to worry about the problem with structure matching, so that the full-screen can be kept with lightness, with multiple considerations taken into account.

In the description of embodiments of the present disclosure, orientation or positional relationships indicated by terms "middle", "upper", "lower", "front", "back", "vertical", "horizontal", "top", "bottom", "inside", "outside" and the like are based on the orientation or positional relationships shown in the drawings, and are for the purpose of ease of description of the present disclosure and simplification of the description only, but are not intended to indicate or imply that the mentioned device or element must have a specific orientation, or be constructed and operated in a particular orientation, and therefore they should not be construed as limitation to the present disclosure.

In the description of the embodiments of present disclosure, unless otherwise clearly specified and defined, the terms "install", "connect" and "link" should be broadly interpreted, for example, it may be connected fixedly or connected detachably, or integrated, it may be a mechanical connection or an electrical connection, it may be directly connected, or may be indirectly connected through an intermediate medium, or an internal connection between two elements. Those of ordinary skills in the art may understand the specific meanings of the above terms in the present disclosure according to situations.

Although the embodiments disclosed in the present disclosure are as described above, the embodiments described in the above contents are only for the present disclosure to be understood easily, not for limiting the present disclosure. Any person skilled in the art to which the present disclosure pertains may make any modifications and variations in the form and details of implementation without departing from the spirit and scope of the present disclosure. Nevertheless, the protection scope of the present disclosure shall still be determined by the scope defined by the appended claims.

What is claimed is:

1. A touch substrate, comprising: a substrate, and a first conductive layer, a first insulating layer and a second conductive layer sequentially stacked on the substrate, wherein:

the first conductive layer comprises a first capacitive touch electrode, a first wiring and a second wiring;

the first wiring is electrically connected to the first capacitive touch electrode, and the second wiring is insulated from the first capacitive touch electrode;

the first insulating layer comprises at least one first via;

the second conductive layer comprises a second capacitive touch electrode, which is electrically connected to the second wiring through the first via; and the second conductive layer further comprises an additional functional channel, which is insulated from the second capacitive touch electrode;

wherein a light shield layer is provided between the substrate and the first conductive layer, and an orthographic projection of the light shield layer on the substrate comprises the orthographic projections of the first wiring and the second wiring on the substrate.

2. The touch substrate according to claim 1, wherein the first capacitive touch electrode is a driving electrode and the second capacitive touch electrode is a sensing electrode; or, the first capacitive touch electrode is a sensing electrode and the second capacitive touch electrode is a driving electrode.

3. The touch substrate according to claim 1, wherein the touch substrate further comprises a binding region, which comprises an additional functional binding region and a touch binding region;

the additional functional binding region and the touch binding region are disposed side by side, and share a flexible printed circuit board; and when the additional functional channel operates, the additional functional driving chip connected to the additional functional binding region is configured to: power on and perform data transmission and processing to carry out the function of the additional functional channel.

4. The touch substrate according to claim 1, wherein the first conductive layer further comprises a first dummy electrode located on both sides of the first capacitive touch electrode along a second direction, and the first dummy electrode and the first capacitive touch electrode are insulated from each other.

5. The touch substrate according to claim 1, wherein the second conductive layer further comprises a second dummy electrode and a dummy electrode connecting wire;

the second dummy electrode comprises a plurality of second sub-dummy electrodes located on both sides of the second capacitive touch electrode along a second direction; and the second sub-dummy electrodes and the second capacitive touch electrode are insulated from each other, and the plurality of second sub-dummy electrodes are electrically connected through the dummy electrode connecting wire.

6. The touch substrate according to claim 5, wherein an orthographic projection of the second dummy electrode on the substrate comprises an orthographic projection of the first wiring on the substrate, and the orthographic projection of the second dummy electrode on the substrate comprises an orthographic projection of the second wiring on the substrate.

7. The touch substrate according to claim 1, wherein the additional functional channel comprises an electromagnetic channel, which comprises a second electromagnetic touch electrode and a fourth wiring;

the second electromagnetic touch electrode is located on both sides of the second capacitive touch electrode along a first direction, and the second electromagnetic touch electrode and the second capacitive touch electrode are insulated from each other;

the fourth wiring is electrically connected to the second electromagnetic touch electrode;

the first conductive layer further comprises a first electromagnetic touch electrode and a third wiring;

the first electromagnetic touch electrode is located on both sides of the first capacitive touch electrode along a second direction, and the first electromagnetic touch electrode and the first capacitive touch electrode are insulated from each other; and the third wiring is electrically connected to the first electromagnetic touch electrode.

8. The touch substrate according to claim 7, wherein the first electromagnetic touch electrode comprises a plurality of electrodes, and the plurality of first electromagnetic touch electrodes are parallel to each other;

the second electromagnetic touch electrode comprises a plurality of electrodes, and the plurality of second electromagnetic touch electrodes are parallel to each other; and the first electromagnetic touch electrode and the second electromagnetic touch electrode are disposed in a cross insulation; wherein, the first electromagnetic touch electrode is configured to determine coordinate information of a touch point in the second direction when electromagnetic touch occurs, and the second electromagnetic touch electrode is configured to determine coordinate information of a touch point in the first direction.

9. The touch substrate according to claim 8, wherein the first electromagnetic touch electrode is located between two adjacent first capacitive touch electrodes, and the second electromagnetic touch electrode is located between two adjacent second capacitive touch electrodes.

10. The touch substrate according to claim 1, wherein the additional functional channel comprises an electromagnetic channel, which comprises a second electromagnetic touch electrode;

the second electromagnetic touch electrode is located on both sides of the second capacitive touch electrode along a first direction, and the second electromagnetic touch electrode and the second capacitive touch electrode are insulated from each other;

the first conductive layer further comprises a first electromagnetic touch electrode, a third wiring and a fourth wiring, and the first insulating layer further comprises a second via;

the first electromagnetic touch electrode is located on both sides of the first capacitive touch electrode along a second direction, and the first electromagnetic touch electrode and the first capacitive touch electrode are insulated from each other; and the third wiring is electrically connected to the first electromagnetic touch electrode, and the fourth wiring is connected to the second electromagnetic touch electrode through the second via.

11. The touch substrate according to claim 10, wherein the first electromagnetic touch electrode comprises a plurality of electrodes, and the plurality of first electromagnetic touch electrodes are parallel to each other;

the second electromagnetic touch electrode comprises a plurality of electrodes, and the plurality of second electromagnetic touch electrodes are parallel to each other; and the first electromagnetic touch electrode and the second electromagnetic touch electrode are disposed in a cross insulation; wherein the first electromagnetic touch electrode is configured to determine coordinate information of a touch point in the second direction when electromagnetic touch occurs, and the second electromagnetic touch electrode is configured to determine coordinate information of a touch point in the first direction.

12. The touch substrate according to claim 11, wherein the first electromagnetic touch electrode is located between two adjacent first capacitive touch electrodes, and the second electromagnetic touch electrode is located between two adjacent second capacitive touch electrodes.

13. The touch substrate according to claim 1, wherein
the additional functional channel comprises an antenna channel, and the first conductive layer further comprises an antenna lead; and the antenna channel comprises a wireless communication antenna, and the first insulating layer further comprises a third via through which the antenna lead is electrically connected to the wireless communication antenna, and the wireless communication antenna extends along a second direction.

14. The touch substrate according to claim 13, wherein the wireless communication antenna is a Bluetooth™ communication antenna, a wireless fidelity communication antenna or a GPS antenna.

15. The touch substrate according to claim 13, wherein
the wireless communication antenna comprises one antenna or a plurality of antennas, and one wireless communication antenna is located between two adjacent second capacitive touch electrodes.

16. The touch substrate according to claim 1, further comprising: a second insulating layer disposed on the second conductive layer and a transparent photosensitive layer disposed on the second insulating layer, wherein the transparent photosensitive layer is a transparent photosensitive keyboard film attached on the second insulating layer or transparent photosensitive ink printed on the second insulating layer.

17. A touch device, comprising: a touch substrate, which comprises a substrate, and a first conductive layer, a first insulating layer and a second conductive layer sequentially stacked on the substrate, wherein:

the first conductive layer comprises a first capacitive touch electrode, a first wiring and a second wiring; the first wiring is electrically connected to the first capacitive touch electrode, and the second wiring is insulated from the first capacitive touch electrode;

the first insulating layer comprises at least one first via; and the second conductive layer comprises a second capacitive touch electrode, which is electrically connected to the second wiring through the first via; the second conductive layer further comprises an additional functional channel, which is insulated from the second capacitive touch electrode;

wherein a light shield layer is provided between the substrate and the first conductive layer, and an orthographic projection of the light shield layer on the substrate comprises the orthographic projections of the first wiring and the second wiring on the substrate.

18. A preparation method of a touch substrate, comprising:

forming a first conductive layer on a substrate, wherein the first conductive layer comprises a first capacitive touch electrode, a first wiring and a second wiring; the first wiring is electrically connected to the first capacitive touch electrode, and the second wiring is insulated from the first capacitive touch electrode;

forming a first insulating layer on one side of the first conductive layer away from the substrate, wherein the first insulating layer comprises at least one first via; and forming a second conductive layer on one side of the first insulating layer away from the first conductive layer, wherein the second conductive layer comprises a second capacitive touch electrode, which is electrically connected to the second wiring through the first via;

wherein the second conductive layer further comprises an additional functional channel, which is insulated from the second capacitive touch electrode;

wherein the first conductive layer, the first insulating layer and the second conductive layer are sequentially stacked on the substrate;

wherein a light shield layer is provided between the substrate and the first conductive layer, and an orthographic projection of the light shield layer on the substrate comprises the orthographic projections of the first wiring and the second wiring on the substrate.

19. The preparation method according to claim 18, further comprising:

forming a second insulating layer on one side of the second conductive layer away from the first insulating layer; and forming a transparent photosensitive layer on one side of the second insulating layer away from the second conductive layer, wherein the transparent photosensitive layer is a transparent photosensitive keyboard film attached on the second insulating layer or transparent photosensitive ink printed on the second insulating layer.

* * * * *